(12) United States Patent
Guertler et al.

(10) Patent No.: US 9,296,859 B2
(45) Date of Patent: Mar. 29, 2016

(54) METHOD FOR PRODUCING POLYETHERESTER CARBONATE POLYOLS

(71) Applicant: BAYER INTELLECTUAL PROPERTY GMBH, Monheim (DE)

(72) Inventors: Christoph Guertler, Cologne (DE); Thoams Ernst Mueller, Aachen (DE); Anthony Kermagoret, Moelan sur mer (FR); Yvonne Dienes, Hannover (DE); Julien Barruet, Fresnes (FR); Aurel Wolf, Wuelfrath (DE); Stefan Grasser, Leverkusen (DE)

(73) Assignee: BAYER INTELLECTUAL PROPERTY GMBH, Monheim (DE)

( * ) Notice: Subject to any disclaimer, the term of this patent is extended or adjusted under 35 U.S.C. 154(b) by 0 days.

(21) Appl. No.: 14/365,622

(22) PCT Filed: Dec. 10, 2012

(86) PCT No.: PCT/EP2012/074985
§ 371 (c)(1),
(2) Date: Jun. 14, 2014

(87) PCT Pub. No.: WO2013/087582
PCT Pub. Date: Jun. 20, 2013

(65) Prior Publication Data
US 2014/0329987 A1  Nov. 6, 2014

(30) Foreign Application Priority Data
Dec. 16, 2011 (EP) .................. 11194163

(51) Int. Cl.
*C08G 65/26* (2006.01)
*C08G 64/34* (2006.01)
*C08G 64/18* (2006.01)
*C08G 18/44* (2006.01)
*C08G 18/48* (2006.01)

(52) U.S. Cl.
CPC .......... *C08G 65/2663* (2013.01); *C08G 64/183* (2013.01); *C08G 64/34* (2013.01); *C08G 65/26* (2013.01); *C08G 65/2615* (2013.01); *C08G 18/44* (2013.01); *C08G 18/4825* (2013.01)

(58) Field of Classification Search
CPC .. C08G 65/2663; C08G 64/34; C08G 64/183; C08G 65/34; C08G 18/44; C08G 18/4825
See application file for complete search history.

(56) References Cited

U.S. PATENT DOCUMENTS

| | | | |
|---|---|---|---|
| 4,500,704 A * | 2/1985 | Kruper et al. | 528/405 |
| 6,713,599 B1 | 3/2004 | Hinz et al. | |
| 7,977,501 B2 | 7/2011 | Haider et al. | |
| 8,134,022 B2 | 3/2012 | Haider et al. | |
| 8,933,192 B2 * | 1/2015 | Gurtler et al. | 528/421 |
| 2012/0289732 A1 | 11/2012 | Guertler et al. | |

FOREIGN PATENT DOCUMENTS

| | | |
|---|---|---|
| EP | 2287226 A1 | 2/2011 |
| WO | 2011089120 A1 | 7/2011 |

OTHER PUBLICATIONS

International Search Report received in corresponding PCT/EP2012/074985 mailed Sep. 3, 2013.
Liu et al., Synthesis, Characterization and Hydrolysis of an Aliphatic Polycarbonatet by Terpolymerization of Carbon Dioxide, Propylene Oxide and Maleic Anhydride, ScienceDirect, Polymer, BD. 47, 2006, XP002677228, pp. 8453-8461.
Xu et al., Study on Synthesis of a Novel Polyetherester Polyol, Database Caplus, Chemical Abstracts Service, XP002677229, Columbus, OH, Nov. 15, 2011, (2 pages).

* cited by examiner

*Primary Examiner* — Gregory Listvoyb
(74) *Attorney, Agent, or Firm* — MMWV IP, LLC.

(57) ABSTRACT

The present invention relates to a method for producing polyetherester carbonate polyols by means of catalytic addition of carbon dioxide, alkylene oxides and cyclic anhydrides to H-functional starter compounds in the presence of double metal cyanide (DMC) catalysts.

18 Claims, No Drawings

METHOD FOR PRODUCING POLYETHERESTER CARBONATE POLYOLS

CROSS REFERENCE TO RELATED APPLICATIONS

This application is a §371 National Stage Application of PCT/EP2012/074985, filed Dec. 10, 2012 which claims priority to EP 11194163.9, filed Dec. 16, 2011.

BACKGROUND

1. Field of the Invention

The present invention relates to a process for preparing polyether ester carbonate polyols by catalytic addition of carbon dioxide, alkylene oxides and cyclic anhydrides onto H-functional starter substances in the presence of double metal cyanide (DMC) catalyst.

2. Description of Related Art

The preparation of polyether carbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Alkylenoxide with Organometallic Compounds; Die Makromolekulare Chemie 130, 210-220, 1969). This reaction is shown in schematic form in scheme (I), where R is an organic radical such as alkyl, alkylaryl or aryl, each of which may also contain heteroatoms, for example O, S, Si, etc., and where e and f are each integers, and where the product shown here in scheme (I) for the polyether carbonate polyol should merely be understood in such a way that blocks having the structure shown may in principle be present in the polyether carbonate polyol obtained, but the sequence, number and length of the blocks and the OH functionality of the starter may vary, and it is not restricted to the polyether carbonate polyol shown in scheme (I). This reaction (see scheme (I)) is environmentally very advantageous, since this reaction constitutes the conversion of a greenhouse gas such as $CO_2$ to a polymer. A further product formed here as an unwanted by-product is the cyclic carbonate shown in scheme (I) (for example, when $R=CH_3$, propylene carbonate).

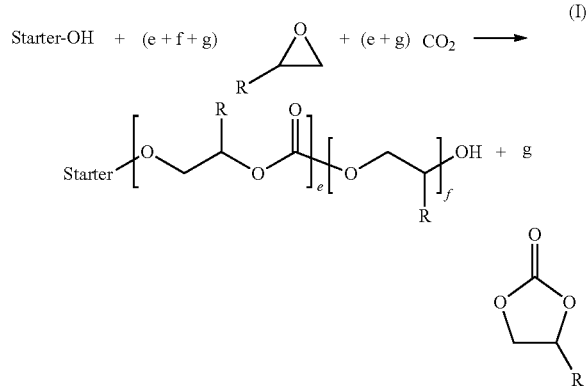

Activation in the context of this invention refers to a step in which a portion of alkylene oxide compound, optionally in the presence of $CO_2$ and/or H-functional starter compound, is added to the DMC catalyst and then the addition of the alkylene oxide compound is interrupted, and a subsequent exothermic chemical reaction causes an evolution of heat to be observed which can lead to a temperature peak ("hotspot"), and the conversion of alkylene oxide and optionally $CO_2$ can cause a pressure drop to be observed in the reactor. Optionally, the portion of the alkylene oxide compound can be added in a plurality of individual steps, in which case the occurrence of evolution of heat is generally awaited each time. The process step of activation comprises the period from commencement of the addition of the portion of alkylene oxide compound, which is optionally effected in the presence of $CO_2$, to the DMC catalyst until the end of the evolution of heat. In the case of addition of a portion of the alkylene oxide compound in a plurality of individual steps, the process step of activation comprises all the periods during which the portions of the alkylene oxide compound, optionally in the presence of $CO_2$, have been added stepwise until the end of the evolution of heat after the addition of the last portion of the alkylene oxide compound. In general, the activation step may be preceded by a step for drying the DMC catalyst and optionally the H-functional starter compound at elevated temperature and/or reduced pressure, optionally with passage of an inert gas through the reaction mixture.

EP-A 2 287 226 discloses the copolymerization of propylene oxide, maleic anhydride and carbon dioxide in the presence of double metal cyanide catalysts, where it is optionally also possible to add further monomers, for example anhydrides, to the polymerization.

Liu Y. et al., "Synthesis, characterization and hydrolysis of an aliphatic polycarbonate", POLYMER, vol. 47, 2006, pages 8453-8461 discloses the terpolymerization of propylene oxide, carbon dioxide and maleic anhydride over polymer-supported bimetallic complexes. However, H-functional starter compounds and DMC catalysts are not used.

Database Caplus (Online) Chemical Abstracts Service, Columbus, Ohio, US; 15, Nov. 2011, Dong Xu et al., "Study on synthesis of a novel polyester polyol" discloses the preparation of hydroxyl-terminated polyether ester polyols by copolymerization of propylene oxide, maleic anhydride and carbon dioxide in the presence of double metal cyanide catalysts. Dong Xu et al., however, do not disclose activation of the DMC catalyst in the presence of a cyclic anhydride.

WO-A 2011/089120 discloses the copolymerization of propylene oxide and carbon dioxide in the presence of double metal cyanide catalysts, where the double metal cyanide catalyst can be activated in a multistage process. However, the addition of anhydrides in the activation steps is not disclosed.

U.S. Pat. No. 6,713,599 B1 discloses the copolymerization of propylene oxide and carbon dioxide in the presence of double metal cyanide catalysts.

EP-A 0 222 453 discloses a process for preparing polycarbonates from alkylene oxides and carbon dioxide using a catalyst system composed of DMC catalyst and a cocatalyst such as zinc sulfate. This polymerization is initiated by contacting a portion of the alkylene oxide with the catalyst system once. Only thereafter are the residual amount of alkylene oxide and the carbon dioxide metered in simultaneously. The amount of 60% by weight of alkylene oxide compound relative to the H-functional starter compound, as specified in EP-A 0 222 453 for the activation step in examples 1 to 7, is high and has the disadvantage that this constitutes a certain safety risk for industrial scale applications because of the high exothermicity of the homopolymerization of alkylene oxide compounds.

WO-A 2003/029325 discloses a process for preparing high molecular weight aliphatic polyether carbonate polyols (weight-average molecular weight greater than 30 000 g/mol), in which a catalyst from the group consisting of zinc carboxylate and multimetal cyanide compound is used, this catalyst being anhydrous and first being contacted with at least a portion of the carbon dioxide before the alkylene oxide is added. Final $CO_2$ pressures of up to 150 bar place very high demands on the reactor and on safety. Even the excessively high pressure of 150 bar resulted in incorporation of only about 33% by weight of $CO_2$ up to a maximum of 42% by weight of $CO_2$ into the polymer. The examples detailed describe the use of a solvent (toluene) which has to be removed again by thermal means after the reaction, which leads to increased time and cost demands. Furthermore, the polymers, with a polydispersity of 2.7 or more, have a very broad molar mass distribution.

SUMMARY

It was therefore an object of the present invention to provide a process for preparing polyether ester carbonate polyols which has a favorable selectivity (i.e. low ratio of cyclic carbonate to polyether ester carbonate polyol). In a preferred embodiment of the invention, a high content of $CO_2$ incorporated into the polymer is also to be achieved at the same time.

It has now been found that, surprisingly, the object of the invention is achieved by a process for preparing polyether ester carbonate polyols by catalytic addition of carbon dioxide, alkylene oxides and cyclic anhydrides onto one or more H-functional starter substances in the presence of double metal cyanide (DMC) catalyst, wherein preferably, in a first step, the DMC catalyst and at least one H-functional starter substance are initially charged and, in a second step, the DMC catalyst is activated by addition of alkylene oxide, $CO_2$ and optionally cyclic anhydride, and, in a third step [polymerization stage], the alkylene oxide, cyclic anhydride and $CO_2$ monomers are added. The invention further provides polyether ester carbonate polyols obtainable by the process according to the invention.

DETAILED DESCRIPTION OF A PREFERRED EMBODIMENT

A preferred embodiment of the process according to the invention for preparing polyether ester carbonate polyols from one or more H-functional starter compounds, one or more alkylene oxides, carbon dioxide and one or more cyclic anhydrides in the presence of a DMC catalyst is characterized in that ($\alpha$) the H-functional starter substance or a mixture of at least two H-functional starter substances is initially charged and any water and/or other volatile compounds are removed by elevated temperature and/or reduced pressure [first activation stage], with addition of the DMC catalyst to the H-functional starter substance or to the mixture of at least two H-functional starter substances before or after the 1st activation stage, ($\beta$) a portion (based on the total amount of alkylene oxides used in steps ($\beta$) and ($\gamma$)) of one or more alkylene oxides and optionally a portion (based on the total amount of cyclic anhydrides used in steps ($\beta$) and ($\gamma$)) of one or more cyclic anhydrides is added to the mixture resulting from step ($\alpha$) [second activation stage], where this addition of a portion of alkylene oxide can optionally be effected in the presence of $CO_2$ and/or inert gas (for example nitrogen or argon), and where step ($\beta$) can also be effected more than once, ($\gamma$) one or more alkylene oxides, one or more cyclic anhydrides and carbon dioxide are metered constantly into the mixture resulting from step ($\beta$) [polymerization stage], where the alkylene oxides and/or cyclic anhydrides used for the terpolymerization are the same as or different than the alkylene oxides and/or cyclic anhydrides used in step ($\beta$).

Step ($\alpha$):

The addition of the individual components in step ($\alpha$) can be effected simultaneously or successively in any sequence; preferably, in step ($\alpha$), DMC catalyst is first initially charged and H-functional starter compound is added simultaneously or subsequently.

A preferred embodiment provides a process wherein, in step ($\alpha$), ($\alpha$1) a reactor is initially charged with the DMC catalyst and one or more H-functional starter compounds, ($\alpha$2) an inert gas (for example nitrogen or a noble gas such as argon), an inert gas-carbon dioxide mixture or carbon dioxide is passed through the reactor at a temperature of 50 to 200° C., preferably of 80 to 160° C., more preferably of 125 to 135° C., and, at the same time, a reduced pressure (in absolute terms) of 10 mbar to 800 mbar, preferably of 40 mbar to 200 mbar, is established in the reactor by removing the inert gas or carbon dioxide (for example with a pump) [first activation stage].

A further preferred embodiment provides a process wherein, in step ($\alpha$), ($\alpha$1) the H-functional starter compound or a mixture of at least two H-functional starter compounds is initially charged, optionally under inert gas atmosphere (for example nitrogen or argon), under an atmosphere of inert gas-carbon dioxide mixture or under a pure carbon dioxide atmosphere, more preferably under inert gas atmosphere (for example nitrogen or argon) and ($\alpha$2) an inert gas (for example nitrogen or a noble gas such as argon), an inert gas-carbon dioxide mixture or carbon dioxide, more preferably inert gas (for example nitrogen or argon), is introduced into the resulting mixture of DMC catalyst and one or more H-functional starter compounds at a temperature of 50 to 200° C., preferably of 80 to 160° C., more preferably of 125 to 135° C., and, at the same time, a reduced pressure (in absolute terms) of 10 mbar to 800 mbar, preferably of 40 mbar to 200 mbar, is established in the reactor by removing the inert gas or carbon dioxide (for example with a pump) [first activation stage], where the double metal cyanide catalyst is added to the H-functional starter substance or the mixture of at least two H-functional starter substances in step ($\alpha$1) or immediately thereafter in step ($\alpha$2).

The DMC catalyst can be added in solid form or as a suspension in an H-functional starter compound. If the DMC catalyst is added as a suspension, this is preferably added in step ($\alpha$1) to the one or more H-functional starter compounds.

Step ($\beta$):

The step of the second activation stage (step ($\beta$)) can be effected in the presence of $CO_2$ and/or inert gas (for example nitrogen or argon). For example, step ($\beta$) is effected under an atmosphere of inert gas-carbon dioxide mixture (for example nitrogen-carbon dioxide mixture or argon-carbon dioxide mixture) or a carbon dioxide atmosphere, more preferably under carbon dioxide atmosphere. The establishment of an atmosphere of inert gas-carbon dioxide mixture (for example nitrogen-carbon dioxide mixture or argon-carbon dioxide mixture) or of a carbon dioxide atmosphere and the metered addition of one or more alkylene oxides can in principle be effected in different ways. The supply pressure is preferably established by introduction of carbon dioxide, where the pressure (in absolute terms) is 10 mbar to 100 bar, preferably 100 mbar to 50 bar and especially preferably 500 mbar to 50 bar. The commencement of the metered addition of the alkylene oxide can be effected from vacuum or at a previously chosen supply pressure. The total pressure (in absolute terms) of the atmosphere of inert gas-carbon dioxide mixture (for example nitrogen-carbon dioxide mixture or argon-carbon dioxide mixture) or of a carbon dioxide atmosphere and any alkylene oxide set in step (β) is preferably a range from 10 mbar to 100 bar, preferably 100 mbar to 50 bar and more preferably 500 mbar to 50 bar. Optionally, during or after the metered addition of the alkylene oxide, the pressure is readjusted by introducing further carbon dioxide, where the pressure (in absolute terms) is 10 mbar to 100 bar, preferably 100 mbar to 50 bar and more preferably 500 mbar to 50 bar.

In a preferred embodiment, the amount of one or more alkylene oxides used in the activation in step (β) is 0.1 to 25.0% by weight, preferably 1.0 to 20.0% by weight, especially preferably 2.0 to 16.0% by weight (based on the amount of starter compound used in step (α)). The alkylene oxide can be added in one step or stepwise in two or more portions.

In a particularly preferred embodiment of the invention, in the activation in step (β), a portion (based on the total amount of cyclic anhydrides used in steps (β) and (µ)) of one or more cyclic anhydrides is added to the mixture resulting from step (α) [second activation stage], where this addition of a portion of alkylene oxide can optionally be effected in the presence of $CO_2$ and/or inert gas (for example nitrogen or argon), and where step (β) can also be effected more than once. Cyclic anhydrides and alkylene oxides are used in the activation in step (β) in molar ratios of 1:2 to 1:100, preferably 1:5 to 1:50, especially preferably in molar ratios of 1:5 to 1:25. The cyclic anhydride can be added in one step or stepwise in two or more portions. The DMC catalyst is preferably used in such an amount that the content of DMC catalyst in the resulting polyether ester carbonate polyol is 10 to 10 000 ppm, especially preferably 20 to 5000 ppm and most preferably 50 to 500 ppm.

In the second activation step, alkylene oxide and optionally cyclic anhydride are added, for example, in one portion or within 1 to 15 minutes, preferably 5 to 10 minutes. The duration of the second activation step is preferably 15 to 240 minutes, more preferably 20 to 60 minutes.

Step (γ):

The metered addition of one or more alkylene oxides, one or more cyclic anhydrides and the carbon dioxide can be effected simultaneously, alternately or sequentially, where the total amount of carbon dioxide can be added all at once or metered in over the reaction time. It is possible, during the addition of the alkylene oxide and the cyclic anhydride, to increase or lower the $CO_2$ pressure gradually or stepwise or to leave it constant. Preferably, the total pressure is kept constant during the reaction by metered addition of further carbon dioxide. The metered addition of one or more alkylene oxides, one or more cyclic anhydrides and/or the $CO_2$ is effected simultaneously, alternately or sequentially with respect to the metered addition of carbon dioxide. It is possible to meter in the alkylene oxide and/or the cyclic anhydride at a constant metering rate, or to increase or lower the metering rate gradually or stepwise, or to add the alkylene oxide and/or the cyclic anhydride in portions. Preferably, the alkylene oxide and the cyclic anhydride are added to the reaction mixture at a constant metering rate. If a plurality of alkylene oxides are used for synthesis of the polyether ester carbonate polyols, the alkylene oxides can be metered in individually or as a mixture. If a plurality of cyclic anhydrides are used for synthesis of the polyether ester carbonate polyols, the cyclic anhydrides can be metered in individually or as a mixture. The metered addition of the alkylene oxides and/or of the cyclic anhydrides can be effected simultaneously, alternatively or sequentially, each via separate metering points (addition points), or via one or more metering points, in which case the alkylene oxides and/or the cyclic anhydrides can be metered in individually or as a mixture. It is also possible to meter in one or more alkylene oxides as a mixture with one or more cyclic anhydrides. In a preferred embodiment, the cyclic anhydride is metered in as a solution in one or more alkylene oxides. In a preferred embodiment, the ratio of the amount of cyclic anhydride and one or more alkylene oxides used in the polymerization in step (γ) is 1:2 to 1:100, preferably 1:5 to 1:50, more preferably 1:5 to 1:25. It is possible via the manner and/or sequence of the metered addition of the alkylene oxides, cyclic anhydrides and/or the carbon dioxide to synthesize random, alternating, block or gradient polyether ester carbonate polyols.

Preferably, an excess of carbon dioxide is used, based on the calculated amount of carbon dioxide incorporated in the polyether ester carbonate polyol, since an excess of carbon dioxide is advantageous because of the low reactivity of carbon dioxide. The amount of carbon dioxide can be fixed via the total pressure under the respective reaction conditions. An advantageous total pressure (in absolute terms) for the copolymerization for preparation of the polyether ester carbonate polyols has been found to be in the range from 0.01 to 120 bar, preferably 0.1 to 110 bar, more preferably from 1 to 100 bar. It is possible to feed in the carbon dioxide continuously or discontinuously. This depends on how quickly the alkylene oxides and the $CO_2$ are consumed and whether the product is supposed to contain any $CO_2$-free polyether blocks or blocks having different $CO_2$ content. The amount of the carbon dioxide (reported as pressure) can likewise vary in the course of addition of the alkylene oxides. According to the reaction conditions selected, it is possible to introduce the $CO_2$ into the reactor in the gaseous, liquid or supercritical state. $CO_2$ can also be added to the reactor in solid form and then be converted under the selected reaction conditions to the gaseous, dissolved, liquid and/or supercritical state.

In step (γ), the carbon dioxide can be introduced into the mixture, for example, by (i) sparging the reaction mixture in the reactor from below,
(ii) using a hollow-shaft stirrer,
(iii) combination of the metering methods as per (i) and (ii), and/or
(iv) sparging via the liquid surface by use of multilevel stirrer units.

Step (γ) is conducted, for example, at temperatures of 60 to 150° C., preferably from 80 to 120° C., most preferably from 90 to 110° C. If temperatures below 60° C. are set, the reaction ceases. At temperatures above 150° C., the amount of unwanted by-products rises significantly.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the base of the reactor and/or on the side wall of the reactor.

The hollow-shaft stirrer as per (ii) is preferably a stirrer in which the gas is introduced into the reaction mixture via a hollow shaft in the stirrer. The rotation of the stirrer in the reaction mixture (i.e. in the course of mixing) gives rise to a reduced pressure at the end of the stirrer paddle connected to the hollow shaft, such that the gas phase (containing $CO_2$ and any unconsumed alkylene oxide) is sucked out of the gas space above the reaction mixture and is passed through the hollow shaft of the stirrer into the reaction mixture.

The sparging of the reaction mixture as per (i), (ii), (iii) or (iv) can be effected with freshly metered-in carbon dioxide in each case (and/or be combined with suction of the gas out of the gas space above the reaction mixture and subsequent recompression of the gas. For example, the gas sucked out of the gas space above the reaction mixture and compressed, optionally mixed with fresh carbon dioxide and/or alkylene oxide, is introduced into the reaction mixture as per (i), (ii), (iii) and/or (iv). Preferably, the pressure drop which arises through incorporation of the carbon dioxide, the cyclic anhydride and the alkylene oxide into the reaction product in the terpolymerization is balanced out by means of freshly metered-in carbon dioxide.

The introduction of the alkylene oxide can be effected separately or together with the $CO_2$, either via the liquid surface or directly into the liquid phase. Preferably, the alkylene oxide is introduced directly into the liquid phase, since this has the advantage of rapid mixing of the alkylene oxide introduced with the liquid phase and hence avoidance of local concentration peaks of alkylene oxide. The introduction into the liquid phase can be effected via one or more inlet tubes, one or more nozzles or one or more annular arrangements of multiple metering points, which are preferably arranged at the base of the reactor and/or at the side wall of the reactor.

The three steps ($\alpha$), ($\beta$) and ($\gamma$) can be performed in the same reactor, or each can be performed separately in different reactors. Particularly preferred reactor types are stirred tanks, tubular reactors, and loop reactors. If the reaction steps ($\alpha$), ($\beta$) and ($\gamma$) are performed in different reactors, a different reactor type can be used for each step.

Polyether ester carbonate polyols can be prepared in a stirred tank, in which case the stirred tank, according to the design and mode of operation, is cooled via the reactor shell, internal cooling surfaces and/or cooling surfaces within a pumped circulation system. Both in the semi-batchwise application, in which the product is withdrawn only after the end of the reaction, and in the continuous application, in which the product is withdrawn continuously, particular attention should be paid to the metering rate of the alkylene oxide and the cyclic anhydrides. This should be set such that, in spite of the inhibiting action of the carbon dioxide, the alkylene oxides and cyclic anhydrides are depleted quickly enough. The concentration of free alkylene oxides in the reaction mixture during the second activation stage (step $\beta$) is preferably >0 to 100% by weight, especially preferably >0 to 50% by weight, most preferably >0 to 20% by weight (based in each case on the weight of the reaction mixture). The concentration of free alkylene oxides in the reaction mixture during the reaction (step $\gamma$) is preferably >0 to 40% by weight, especially preferably >0 to 25% by weight, most preferably >0 to 15% by weight (based in each case on the weight of the reaction mixture).

A further possible embodiment in a stirred tank (batch) for the copolymerization (step $\gamma$) is characterized in that one or more H-functional starter compounds are also metered continuously into the reactor during the reaction. In the case of performance of the process in semi-batchwise operation, the amount of the H-functional starter compounds which are metered continuously into the reactor during the reaction is preferably at least 20 mol % equivalents, more preferably 70 to 95 mol % equivalents (based in each case on the total amount of H-functional starter compounds). In the case of continuous performance of the process, the amount of the H-functional starter compounds which are metered continuously into the reactor during the reaction is preferably at least 80 mol % equivalents, more preferably 95 to 99.99 mol % equivalents (based in each case on the total amount of H-functional starter compounds).

In a preferred embodiment, the catalyst-starter mixture activated as per steps ($\alpha$) and ($\beta$) is reacted further with alkylene oxides and carbon dioxide in the same reactor. In a further preferred embodiment, the catalyst-starter mixture activated as per steps ($\alpha$) and ($\beta$) is reacted further with alkylene oxides and carbon dioxide in another reaction vessel (for example a stirred tank, tubular reactor or loop reactor). In a further preferred embodiment, the catalyst-starter mixture prepared as per step ($\alpha$) is reacted with alkylene oxides, cyclic anhydrides and carbon dioxide as per steps ($\beta$) and ($\gamma$) in another reaction vessel (for example a stirred tank, tubular reactor or loop reactor).

When the reaction is conducted in a tubular reactor, the catalyst-starter mixture prepared as per step ($\alpha$) or the catalyst-starter mixture activated as per steps ($\alpha$) and ($\beta$) and optionally further starters and alkylene oxides, cyclic anhydrides and carbon dioxide are pumped continuously through a tube. When a catalyst-starter mixture prepared as per step ($\alpha$) is used, the second activation stage as per step ($\beta$) is effected in the first part of the tubular reactor and the terpolymerization as per step ($\gamma$) in the second part of the tubular reactor. The molar ratios of the co-reactants vary according to the desired polymer. In a preferred embodiment, carbon dioxide is metered in here in its liquid or supercritical form, in order to enable optimal miscibility of the components. The carbon dioxide can be introduced in the reactor at the inlet of the reactor and/or via metering points arranged along the reactor. A portion of the alkylene oxides or the cyclic anhydrides can be introduced at the inlet of the reactor. The remaining amount of the alkylene oxides or of the cyclic anhydrides is preferably introduced into the reactor via a plurality of metering points arranged along the reactor. Advantageously, mixing elements for better mixing of the co-reactants are installed, as sold, for example, by Ehrfeld Mikrotechnik BTS GmbH, or mixer-heat exchanger elements which simultaneously improve the mixing and heat removal. Preferably, the mixing elements mix $CO_2$, cyclic anhydride and/or alkylene oxide which have been metered in with the reaction mixture. In an alternative embodiment, different volume elements of the reaction mixture are mixed with one another.

Loop reactors can likewise be used for preparation of polyether ester carbonate polyols. These generally include reactors having internal and/or external material recycling (optionally with heat exchange surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

In order to achieve full conversion, the reaction apparatus in which step ($\gamma$) is performed is frequently connected upstream of a further tank or a tube ("delay tube") in which residual concentrations of free alkylene oxides present after the reaction are depleted. Preferably, the pressure in this downstream reactor is at the same pressure as in the reaction apparatus in which reaction step ($\gamma$) is performed. The pressure in the downstream reactor can, however, also be selected at a higher or lower level. In a further preferred embodiment, the carbon dioxide, after reaction step ($\gamma$), is fully or partly released and the downstream reactor is operated at standard pressure or a slightly elevated pressure. The temperature in the downstream reactor is preferably 10 to 150° C. and more preferably 20 to 100° C. At the end of the post-reaction time or at the outlet of the downstream reactor, the reaction mixture contains preferably less than 0.05% by weight of alkylene oxide. The post-reaction time or the residence time in the downstream reactor is preferably 10 min to 24 h, especially preferably 10 min to 3 h.

The polyether ester carbonate polyols obtained in accordance with the invention preferably have an OH functionality (i.e. average number of OH groups per molecule) of at least 0.8, preferably of 1 to 8, more preferably of 1 to 6 and most preferably of 2 to 4. The molecular weight of the polyether ester carbonate polyols obtained is preferably at least 400, more preferably 400 to 1 000 000 g/mol and most preferably 500 to 60 000 g/mol.

In general, for the process according to the invention, it is possible to use alkylene oxides (epoxides) having 2-45 carbon atoms. The alkylene oxides having 2-45 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preferably, the alkylene oxides used are ethylene oxide and/or propylene oxide, especially propylene oxide.

The cyclic anhydrides used are preferably compounds of the formula (II), (III) or (IV)

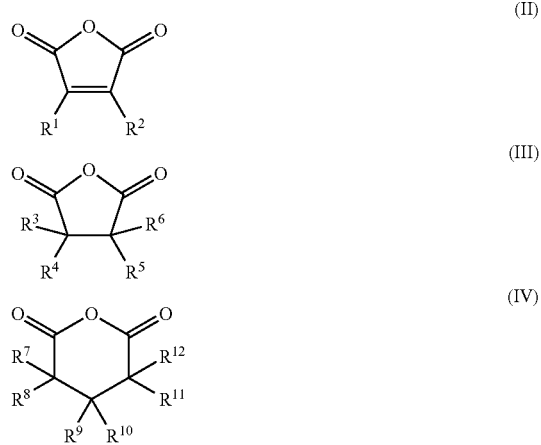

where
R1 and R2 are each hydrogen, halogen, C1-C22-alkyl, C1-C22-akenyl or C6-C18-aryl, or R1 and R2 may each be members of a 4- to 7-membered ring or polycyclic system, R1 and R2 together preferably forming a benzene ring,
R3, R4, R5 and R6 are each hydrogen, C1-C22-alkyl, C1-C22-alkenyl or C6-C18-aryl or may each be members of a 4- to 7-membered ring or polycyclic system and
R7, R8, R9, R10, R11 and R12 are each hydrogen, C1-C22-alkyl, C1-C22-alkenyl or C6-C18-aryl or may each be members of a 4- to 7-membered ring or polycyclic system, where the compounds of the formula (II) and (III) and (IV) may also be substituted by chlorine, bromine, nitro groups or alkoxy groups.

Cyclic anhydrides in the context of the inventions are also preferably maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride and allylnorbornenedioic anhydride.

Suitable H-functional starter compounds (starters) used may be compounds having hydrogen atoms active in respect of the alkoxylation. Groups which have active hydrogen atoms and are active in respect of the alkoxylation are, for example, —OH, —NH$_2$ (primary amines), —NH— (secondary amines), —SH and —CO$_2$H, preferably —OH and —NH$_2$, especially preferably —OH. The H-functional starter substances used are, for example, one or more compounds selected from the group consisting of mono- or polyhydric alcohols, polyfunctional amines, polyhydric thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines (for example the products called Jeffamines® from Huntsman, for example D-230, D-400, D-2000, T-403, T-3000, T-5000 or corresponding BASF products, for example Polyetheramine D230, D400, D200, T403, T5000), polytetrahydrofurans (e.g. PolyTHF® from BASF, for example PolyTHF® 250, 650S, 1000, 1000S, 1400, 1800, 2000), polytetrahydrofuranamines (BASF product Polytetrahydrofuranamine 1700), polyether thiols, polyacrylate polyols, castor oil, the mono- or diglyceride of castor oil, monoglycerides of fatty acids, chemically modified mono-, di- and/or triglycerides of fatty acids, and C$_1$-C$_{24}$-alkyl fatty acid esters containing an average of at least 2 OH groups per molecule. By way of example, the C$_1$-C$_{24}$-alkyl fatty acid esters containing an average of at least 2 OH groups per molecule are commercial products such as Lupranol Balance® (from BASF AG), Merginol® products (from Hobum Oleochemicals GmbH), Sovermol® products (from Cognis Deutschland GmbH & Co. KG) and Soyol®TM products (from USSC Co.).

The monofunctional starter compounds used may be alcohols, amines, thiols and carboxylic acids. The monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine.

Useful monofunctional amines include: butylamine, tert-butylamine, pentylamine, hexylamine, aniline, aziridine, pyrrolidine, piperidine, morpholine. The monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, 1,3-propanediol, 1,4-butanediol, 1,4-butenediol, 1,4-butynediol, neopentyl glycol, 1,5-pentantanediol, methylpentanediols (for example 3-methyl-1,5-pentanediol), 1,6-hexanediol; 1,8-octanediol, 1,10-decanediol, 1,12-dodecanediol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and all the modification products of these aforementioned alcohols with different amounts of ε-caprolactone.

The H-functional starter substances may also be selected from the substance class of the polyether polyols, especially those having a molecular weight $M_n$ in the range from 100 to 4000 g/mol. Preference is given to polyether polyols formed from repeating ethylene oxide and propylene oxide units, preferably having a proportion of 35 to 100% propylene oxide units, more preferably having a proportion of 50 to 100% propylene oxide units. These may be random copolymers, gradient copolymers, alternating copolymers or block copolymers of ethylene oxide and propylene oxide. Suitable polyether polyols formed from repeating propylene oxide and/or ethylene oxide units are, for example, the Desmophen®, Acclaim®, Arcol®, Baycoll®, Bayfill®, Bayflex®, Baygal®, PET® and polyether polyols from Bayer MaterialScience AG (for example Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homo-polyethylene oxides are, for example, the Pluriol® E brands from BASF SE; suitable homo-polypropylene oxides are, for example, the Pluriol® P brands from BASF SE; suitable mixed copolymers of ethylene oxide and propylene oxide are, for example, the Pluronic® PE or Pluriol® RPE brands from BASF SE.

The H-functional starter substances may also be selected from the substance class of the polyester polyols, especially those having a molecular weight $M_n$ in the range from 200 to 4500 g/mol. The polyester polyols used are at least difunctional polyesters. Preferably, polyester polyols consist of alternating acid and alcohol units. The acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. The alcohol components used are, for example, ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol or mixtures of the alcohols mentioned. If the alcohol components used are dihydric or polyhydric polyether polyols, the result is polyester ether polyols which can likewise serve as starter substances for preparation of the polyether carbonate polyols. Preference is given to using polyether polyols with $M_n$=150 to 2000 g/mol for preparation of the polyester ether polyols.

In addition, the H-functional starter substances used may be polycarbonate diols, especially those having a molecular weight $M_n$ in the range from 150 to 4500 g/mol, preferably 500 to 2500, which are prepared, for example, by reaction of phosgene, dimethyl carbonate, diethyl carbonate or diphenyl carbonate and difunctional alcohols or polyester polyols or polyether polyols. Examples of polycarbonates can be found, for example, in EP-A 1359177. For example, the polycarbonate diols used may be the Desmophen® C products from Bayer MaterialScience AG, for example Desmophen® C 1100 or Desmophen® C 2200.

In a further embodiment of the invention, it is possible to use polyether carbonate polyols and/or polyether ester carbonate polyols as H-functional starter substances. More particularly, polyether ester carbonate polyols obtainable by the process according to the invention described here are used. For this purpose, these polyether ester carbonate polyols used as H-functional starter substances are prepared in a separate reaction step beforehand.

The H-functional starter substances generally have an OH functionality (i.e. the number of hydrogen atoms active in respect of the polymerization per molecule) of 1 to 8, preferably of 2 to 6 and more preferably of 2 to 4. The H-functional starter substances are used either individually or as a mixture of at least two H-functional starter substances.

Preferred H-functional starter substances are alcohols of the general formula (V)

$$HO-(CH_2)_x-OH \qquad (V)$$

where x is a number from 1 to 20, preferably an even number from 2 to 20. Examples of alcohols of the formula (V) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols of the formula (V) with ε-caprolactone, for example reaction products of trimethylolpropane with ε-caprolactone, reaction products of glycerol with ε-caprolactone, and reaction products of pentaerythritol with ε-caprolactone. Preference is further given to using, as H-functional starter compounds, water, diethylene glycol, dipropylene glycol, castor oil, sorbitol and polyether polyols formed from repeating polyalkylene oxide units.

More preferably, the H-functional starter substances are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, where the polyether polyol has been formed from a di- or tri-H-functional starter compound and propylene oxide or a di- or tri-H-functional starter compound, propylene oxide and ethylene oxide. The polyether polyols preferably have an OH functionality of 2 to 4 and a molecular weight $M_n$ in the range from 62 to 4500 g/mol and especially a molecular weight $M_n$ in the range from 62 to 3000 g/mol.

Double metal cyanide (DMC) catalysts for use in the homopolymerization of alkylene oxides are known in principle from the prior art (see, for example, U.S. Pat. Nos. 3,404,109, 3,829,505, 3,941,849 and 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and enable the preparation of polyether carbonate polyols at very low catalyst concentrations. A typical example is that of the highly active DMC catalysts which are described in EP-A 700 949 and contain, as well as a double metal cyanide compound (e.g. zinc hexacyanocobaltate(III)) and an organic complex ligand (e.g. tert-butanol), also a polyether having a number-average molecular weight greater than 500 g/mol.

The inventive DMC catalysts are preferably obtained by
(a) in the first step reacting an aqueous solution of a metal salt with the aqueous solution of a metal cyanide salt in the presence of one or more organic complex ligands, for example of an ether or alcohol,
(b) with removal in the second step of the solid from the suspension obtained from (i) by known techniques (such as centrifugation or filtration),
(c) with optional washing in a third step of the isolated solid with an aqueous solution of an organic complex ligand (for example by resuspending and optionally reisolating by filtration or centrifugation),
(d) with subsequent drying of the solid obtained, optionally after pulverization, at temperatures of generally 20-120° C. and at pressures of generally 0.1 mbar to standard pressure (1013 mbar), and with addition, in the first step or immediately after the precipitation of the double metal cyanide compound (second step), of one or more organic complex ligands, preferably in excess (based on the double metal cyanide compound), and optionally of further complex-forming components.

The double metal cyanide compounds present in the inventive DMC catalysts are the reaction products of water-soluble metal salts and water-soluble metal cyanide salts.

For example, an aqueous solution of zinc chloride (preferably in excess based on the metal cyanide salt, for example potassium hexacyanocobaltate) and potassium hexacyanocobaltate are mixed and then dimethoxyethane (glyme) or tert-butanol (preferably in excess, based on zinc hexacyanocobaltate) is added to the suspension formed.

Metal salts suitable for preparation of the double metal cyanide compounds preferably have the general formula (VI)

$$M(X)_n \quad (VI)$$

where
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
n is 1 when X=sulfate, carbonate or oxalate and
n is 2 when X=halide, hydroxide, carboxylate, cyanate, thiocyanate, isocyanate, isothiocyanate or nitrate,
or suitable metal salts have the general formula (VII)

$$M_r(X)_3 \quad (VII)$$

where
M is selected from the metal cations $Fe^{3+}$, $Al^{3+}$, $Co^{3+}$ and $Cr^{3+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
r is 2 when X=sulfate, carbonate or oxalate and
r is 1 when X=halide, hydroxide, carboxylate, cyanate, thiocyanate, isocyanate, isothiocyanate or nitrate,
or suitable metal salts have the general formula (VIII)

$$M(X)_s \quad (VIII)$$

where
M is selected from the metal cations $Mo^{4+}$, $V^{4+}$ and $W^{4+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate and
s is 4 when X=halide, hydroxide, carboxylate, cyanate, thiocyanate, isocyanate, isothiocyanate or nitrate,
or suitable metal salts have the general formula (IX)

$$M(X)_t \quad (IX)$$

where
M is selected from the metal cations $Mo^{6+}$ and $W^{6+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron (II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (X)

$$(Y)_a M'(CN)_b (A)_c \quad (X)$$

where
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II),
Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate and nitrate, and
a, b and c are integers, where the values of a, b and c are chosen so as to give electronic neutrality of the metal cyanide salt; a is preferably 1, 2, 3 or 4; b is preferably 4, 5 or 6; c preferably has a value of 0.

Examples of suitable metal cyanide salts are sodium hexacyanocobaltate(III), potassium hexacyanocobaltate(III), potassium hexacyanoferrate(II), potassium hexacyanoferrate (III), calcium hexacyanocobaltate(III) and lithium hexacyanocobaltate(III).

Preferred double metal cyanide compounds present in the inventive DMC catalysts are compounds of the general formula (XI)

$$M_x[M'_{x'}(CN)_y]_z \qquad (XI)$$

in which M is as defined in formula (VI) to (IX) and
M' is as defined in formula (X), and
x, x', y and z are integer values and are chosen so as to give electronic neutrality of the double metal cyanide compound.

Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate (III). Further examples of suitable double metal cyanide compounds can be found, for example, in U.S. Pat. No. 5,158,922 (column 8 lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). For example, the organic complex ligands used are water-soluble, organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

It has now been found that, surprisingly, the object stated above is achieved in a particularly advantageous manner by a process for preparing polyether ester carbonate polyols by catalytic addition of carbon dioxide, alkylene oxides and cyclic anhydrides onto one or more H-functional starter substances in the presence of at least one double metal cyanide catalyst, said double metal cyanide catalyst containing at least one unsaturated alcohol (i.e. an alcohol containing at least one C=C or a C≡C bond) as organic complex ligands.

A preferred embodiment of the present invention is thus a process for preparing polyether ester carbonate polyols by catalytic addition of carbon dioxide, alkylene oxides and cyclic anhydrides onto one or more H-functional starter substances in the presence of at least one DMC catalyst, characterized in that the DMC catalyst is prepared by reacting an aqueous solution of a cyanide-free metal salt with the aqueous solution of a metal cyanide salt in the presence of one or more organic complex ligands originating from the class of the unsaturated alcohols, the unsaturated alcohol(s) preferably being present in the aqueous solution of the cyanide-free metal salt, in the aqueous solution of the metal cyanide salt or in both aqueous solutions.

Unsaturated alcohols in the context of this invention are, for example, those of the formula $(R^1)(R^2)(R^3)C(OH)$ where $R^1$ is a hydrocarbyl group of 2 to 20 carbon atoms having at least one C=C and/or at least one C≡C group, and where one of the carbon atoms of the C=C or of the C≡C group is preferably bonded to the carbon that bears the hydroxyl group, and where one or more hydrogen atoms in the hydrocarbyl group may be replaced by atoms other than carbon or hydrogen, and $R^2$ and $R^3$ are each independently hydrogen, $C_1$ to $C_{20}$-alkyl (for example methyl, ethyl, propyl, butyl, pentyl, hexyl), $C_3$ to $C_{12}$-cycloalkyl, phenyl or a hydrocarbyl group of 2 to 20 carbon atoms having at least one C=C and/or at least one C≡C group, where one of the carbon atoms in the C=C or in the C≡C group is preferably bonded to the carbon that bears the hydroxyl group, where one or more hydrogen atoms in each hydrocarbyl group may be replaced by atoms other than carbon or hydrogen.

Preferred unsaturated alcohols are 3-buten-1-ol, 3-butyn-1-ol, 2-propen-1-ol, 2-propyn-1-ol, 2-methyl-3-buten-2-ol, 2-methyl-3-butyn-2-ol, 3-buten-1-ol, 3-butyn-1-ol, 3-methyl-1-penten-3-ol and 3-methyl-1-pentyn-3-ol. It is also possible here that one or more of the hydrogen atoms in the unsaturated alcohols are replaced by halogen atoms (F, Cl, Br, I). Particularly preferred unsaturated alcohols are 2-methyl-3-buten-2-ol, 2-methyl-3-butyn-2-ol and 3-methyl-1-pentyn-3-ol. Most preferred is 3-methyl-1-pentyn-3-ol.

Optionally, in the preparation of the inventive DMC catalysts, one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters or ionic surface- or interface-active compounds, are used.

Preferably, in the preparation of the inventive DMC catalysts, in the first step, the aqueous solutions of the metal salt (e.g. zinc chloride), used in a stoichiometric excess (at least 50 mol %) based on metal cyanide salt, i.e. at least a molar ratio of metal salt to metal cyanide salt of 2.25:1.00), and the metal cyanide salt (e.g. potassium hexacyanocobaltate) are converted in the presence of the organic complex ligand (e.g. tert-butanol), forming a suspension comprising the double metal cyanide compound (e.g. zinc hexacyanocobaltate), water, excess metal salt, and the organic complex ligands.

This organic complex ligand may be present in the aqueous solution of the metal salt and/or of the metal cyanide salt, or it is added directly to the suspension obtained after precipitation of the double metal cyanide compound. It has been found to be advantageous to mix the aqueous solutions of the metal salt and of the metal cyanide salt, and the organic complex ligands by stirring vigorously. Optionally, the suspension formed in the first step is subsequently treated with a further complex-forming component. This complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the inventive catalyst) is isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the inventive catalyst. Preferably, the amount of the organic complex ligand in the aqueous wash solution is between 40 and 80% by weight, based on the overall solution.

Optionally, in the third step, further complex-forming component is added to the aqueous wash solution, preferably in the range between 0.5 and 5% by weight, based on the overall solution.

Moreover, it is advantageous to wash the isolated solid more than once. Preferably, in a first wash step (iii-1), an aqueous solution of the organic complex ligand is used for washing (for example by resuspension and subsequent reisolation by filtration or centrifugation), in order to remove, for example, water-soluble by-products such as potassium chloride from the inventive catalyst in this way. Especially preferably, the amount of the organic complex ligand in the aqueous wash solution is between 40 and 80% by weight, based on the overall solution in the first wash step. In the further wash steps (iii-2), either the first wash step is repeated once or more than once, preferably once to three times, or, preferably, a nonaqueous solution, for example a mixture or solution of organic complex ligands and further complex-forming components (preferably in the range between 0.5 and 5% by weight, based on the total amount of the wash solution in step (iii-2)), is used as a wash solution to wash the solid once or more than once, preferably once to three times.

The isolated and optionally washed solid is subsequently, optionally after pulverization, dried at temperatures of generally 20-100° C. and at pressures of generally 0.1 mbar to standard pressure (1013 mbar).

A preferred process for isolating the inventive DMC catalysts from the suspension by filtration, filtercake washing and drying is described in WO-A 01/80994.

The polyether ester carbonate polyols obtainable by the process according to the invention can be processed without difficulty, especially by reaction with di- and/or polyisocyanates to give polyurethanes, especially to give flexible polyurethane foams, rigid polyurethane foams, polyurethane elastomers or polyurethane coatings. For polyurethane applications, it is preferable to use polyether ester carbonate polyols based on an H-functional starter compound having a functionality of at least 2. In addition, the polyether ester carbonate polyols obtainable by the process according to the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyether carbonate polyols to be used have to fulfill certain material properties, for example molecular weight, viscosity, functionality and/or hydroxyl number.

EXAMPLES

H-Functional Starter Substance (Starter) Used:
PET-1 difunctional poly(oxypropylene)polyol having an OH number of 112 $mg_{KOH}/g$ Epoxides Used:
PO propylene oxide
SO styrene oxide
Anhydrides Used:
MA maleic anhydride
PA phthalic anhydride
DMC Catalysts Used:
DMC-1 This DMC catalyst was prepared according to example 6 of WO-A 01/80994.
DMC-$SiO_2$ The DMC-$SiO_2$ catalyst was prepared according to Green Chemistry 14 (2012) 1168 using 24 µl of aqueous HCl solution (0.001 M).
DMC-$TiO_2$ The DMC-$TiO_2$ catalyst was prepared in a corresponding manner to the DMC-$SiO_2$ catalyst, except that the tetraethyl orthosilicate was replaced by an equimolar amount of titanium(IV) ethoxide.
DMC-2 The DMC catalyst was prepared with an apparatus according to FIG. 4 from WO-A 01/39883. In a loop reactor containing a jet disperser according to FIG. 2 from WO-A 01/39883 having one bore (diameter 0.7 mm), a solution of 258 g of zinc chloride in 937 g of distilled water and 135 g of 3-methyl-1-pentyn-3-ol was circulated at 50° C. For this purpose, a solution of 26 g of potassium hexacyanocobaltate (0.078 mol) in 332 g of distilled water was metered in. The pressure drop in the jet disperser was 2.5 bar. Subsequently, the dispersion formed was circulated at 50° C. and a pressure drop in the jet disperser of 2.5 bar for 60 min. Thereafter, a mixture of 5.7 g of 3-methyl-1-pentyn-3-ol, 159 g of distilled water and 27.6 g of polypropylene glycol 1000 was metered in and the dispersion was then circulated at 50° C. and a pressure drop in the jet disperser of 2.5 bar for 80 min 230 g of the dispersion obtained were filtered in a pressurized suction filter with filter area 20 $cm^3$, and then washed with a mixture of 82 g of 3-methyl-1-pentyn-3-ol, 42.3 g of distilled water and 1.7 g of polypropylene glycol 1000. The washed filtercake was squeezed mechanically between two strips of filter paper and finally dried at 60° C. under high vacuum at about 0.05 bar (absolute) for 2 h.

The polymerization reactions were conducted in a 300 ml Parr pressure reactor. The pressure reactor used in the examples had a height (internal) of 10.16 cm and an internal diameter of 6.35 cm. The reactor was equipped with an electrical heating jacket (maximum heating power 510 watts). The counter-cooling consisted in an immersed tube of external diameter 6 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which projected into the reactor up to 3 mm above the base.

The heating power of the electrical heating jacket during the activation [first activation stage] averaged about 20% of the maximum heating power. As a result of the regulation, the heating power varied by ±5% of the maximum heating power. The occurrence of elevated evolution of heat in the reactor, caused by the rapid conversion of alkylene oxide during the activation of the catalyst [second activation stage], was observed via a reduced heat output of the heating jacket, the counter-cooling being switched on and in some cases a temperature rise in the reactor. The occurrence of evolution of heat in the reactor, caused by the continuous conversion of alkylene oxide during the reaction [polymerization stage], led to lowering of the output of the heating jacket to about 8% of the maximum heating power. As a result of the regulation, the heating power varied by ±5% of the maximum heating power.

The sparging stirrer used in the examples was a hollow shaft stirrer in which the gas was introduced into the reaction mixture via a hollow shaft in the stirrer. The stirrer body mounted on the hollow shaft had four arms and had a diameter of 35 mm and a height of 14 mm. At each end of the arm were mounted two gas outlets which had a diameter of 3 mm. The rotation of the stirrer gave rise to a reduced pressure such that the gas present above the reaction mixture ($CO_2$ and possibly alkylene oxide) was sucked in and introduced through the hollow shaft of the stirrer into the reaction mixture. The abbreviation rpm refers to the number of revolutions of the stirrer per minute.

The impeller stirrer used in some examples was a pitched blade turbine in which a total of two stirrer levels each having four stirrer paddles (45°) which had a diameter of 35 mm and a height of 10 mm were mounted at a distance of 7 mm on the stirrer shaft.

a) The terpolymerization of propylene oxide, anhydrides and $CO_2$ resulted not only in the cyclic propylene carbonate but also in the polyether ester carbonate polyol containing firstly polycarbonate units shown in formula (XIIa)

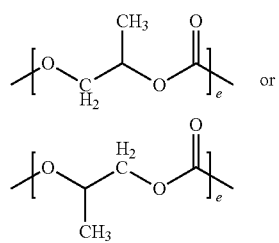
(XIIa)

and secondly polyether units shown in formula (XIIb)

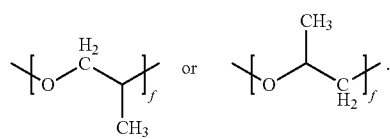
(XIIb)

The reaction mixture was characterized by $^1$H NMR spectroscopy and gel permeation chromatography.

The ratio of the amount of cyclic propylene carbonate to polyether ester carbonate polyol (selectivity; g/e ratio) and the proportion of unconverted monomers (propylene oxide $R_{PO}$, maleic anhydride $R_{MA}$ in mol %) were determined by means of $^1$H NMR spectroscopy. For this purpose, a sample of each reaction mixture obtained after the reaction was dissolved in deuterated chloroform and analyzed on a Bruker spectrometer (AV400, 400 MHz).

Subsequently, the reaction mixture was diluted with dichloromethane (20 ml) and the solution was passed through a falling-film evaporator. The solution (0.1 kg in 3 h) ran downwards along the inner wall of a tube of diameter 70 mm and length 200 mm which had been heated externally to 120° C., in the course of which the reaction mixture was distributed homogeneously as a thin film on the inner wall of the falling-film evaporator in each case by three rollers of diameter 10 mm rotating at a speed of 250 rpm. Within the tube, a pump was used to set a pressure of 3 mbar. The reaction mixture which had been purified to free it of volatile constituents (unconverted epoxides, cyclic carbonate, solvent) was collected in a receiver at the lower end of the heated tube.

The molar ratio of carbonate groups to ether groups in the polyether ester carbonate polyol (e/f ratio) and the molar proportion of anhydride incorporated into the polymer were determined by means of $^1$H NMR spectroscopy. For this purpose, a sample of each purified reaction mixture was dissolved in deuterated chloroform and analyzed on a Bruker spectrometer (AV400, 400 MHz).

The relevant resonances in the $^1$H NMR spectrum (relative to TMS=0 ppm), which were used for integration, are as follows:

I1: 1.10-1.17: methyl group of the polyether units, resonance area corresponds to three hydrogen atoms I2: 1.25-1.34: methyl group of the polycarbonate units, resonance area corresponds to three hydrogen atoms I3: 1.45-1.48: methyl group of the cyclic carbonate, resonance area corresponds to three hydrogen atoms I4: 2.95-3.00: CH group for free, unreacted propylene oxide, resonance area corresponds to one hydrogen atom I5: 6.22-6.29: CH group of the double bond obtained in the polymer via the incorporation of maleic anhydride, resonance area corresponds to two hydrogen atoms I6: 7.05: CH group for free, unreacted maleic anhydride, resonance area corresponds to two hydrogen atoms The figures reported are the molar ratio of the amount of cyclic propylene carbonate to carbonate units in the polyether ester carbonate polyol (selectivity g/e) and the molar ratio of carbonate groups to ether groups in the polyether ester carbonate polyol (e/f), and also the proportions of unconverted propylene oxide (in mol %) and maleic anhydride (in mol %).

Taking account of the relative intensities, the values were calculated as follows:

Molar ratio of the amount of cyclic propylene carbonate to carbonate units in the polyether ester carbonate polyol (selectivity g/e):

$$g/e = I3/I2 \tag{XIII}$$

Molar ratio of carbonate groups to ether groups in the polyether ester carbonate polyol (e/f):

$$e/f = I2/I1 \tag{XIV}$$

The proportion of carbonate units in the repeat units of the polyether ester carbonate polyol:

$$A_{carbonate} = [(I2/3)/((I1/3)+(I2/3)+(I5/2)))] \times 100\% \tag{XV}$$

The proportion of the double bonds which result via the incorporation of the maleic anhydride in the repeat units of the polyether ester carbonate polyol:

$$A_{double\ bond} = [(I5/2)/((I1/3)+(I2/3)+(I5/2)))] \times 100\% \tag{XVI}$$

The molar proportion of the unconverted propylene oxide ($R_{PO}$ in mol %) based on the sum total of the amount of propylene oxide used in the activation and the copolymerization, calculated by the formula:

$$R_{PO} = [I4/((I1/3)+(I2/3)+(I3/3)+I4))] \times 100\% \tag{XVII}$$

The molar proportion of the unconverted maleic anhydride ($R_{MA}$ in mol %) based on the sum total of the amount of maleic anhydride used in the activation and the copolymerization, calculated by the formula:

$$R_{MA} = [I6/(I5+I6)] \times 100\% \tag{XVIII}$$

b) The terpolymerization of styrene oxide, anhydrides and $CO_2$ resulted not only in the cyclic styrene carbonate but also in the polyether ester carbonate polyol containing firstly polycarbonate units shown in formula (XIXa)

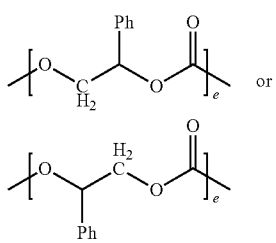

(XIXa)

and secondly polyether units shown in formula (XIXb)

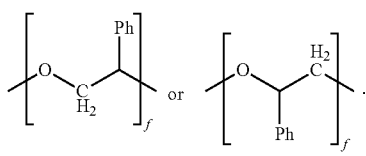

(XIXb)

The relevant resonances in the $^1$H NMR spectrum (relative to TMS=0 ppm), which were used for integration, are as follows:
I7: 4.8: methine group of the polyether units, resonance area corresponds to one hydrogen atom
I8: 6.2: methine group of the polycarbonate units, resonance area corresponds to one hydrogen atom
I9: 5.3: methine group of the polyester units adjacent to the phthalic anhydride group incorporated into the polymer, resonance area corresponds to one hydrogen atom
I10: 5.7: methine group of the cyclic styrene carbonate, resonance area corresponds to one hydrogen atom
I11: 2.8: CH group for free, unreacted styrene oxide, resonance area corresponds to one hydrogen atom
I12: 7.68: aromatic CH group of the benzene rings obtained in the polymer via the incorporation of phthalic anhydride, resonance area corresponds to two hydrogen atoms
I13: 7.99: aromatic CH group for free, unreacted phthalic anhydride, resonance area corresponds to two hydrogen atoms The figures reported are the molar ratio of the amount of cyclic styrene carbonate (4-phenyl-1,3-dioxolan-2-one) to carbonate units in the polyether ester carbonate polyol (selectivity g'/e') and the molar ratio of carbonate groups to ether groups in the polyether ester carbonate polyol (e'/f'), and also the proportions of unconverted styrene oxide (in mol %) and phthalic anhydride (in mol %).

Taking account of the relative intensities, the values were calculated as follows:

Molar ratio of the amount of cyclic styrene carbonate to carbonate units in the polyether ester carbonate polyol (selectivity g'/e'):

$$g'/e'=I10/I8 \quad (XX)$$

Molar ratio of carbonate groups to ether groups in the polyether ester carbonate polyol (e'/f'):

$$e'/f'=I8/I7 \quad (XXI)$$

The proportion of carbonate units in the repeat units of the polyether ester carbonate polyol:

$$A_{carbonate}'=[I8/(I7+I8+I9)]\times 100\% \quad (XXII)$$

The molar proportion of the unconverted styrene oxide ($R_{SO}$ in mol %) based on the sum total of the amount of styrene oxide used in the activation and the copolymerization, calculated by the formula:

$$R_{SO}=[I11/(I7+I8+I9)]\times 100\% \quad (XXIII)$$

The molar proportion of the unconverted phthalic anhydride ($R_{PA}$ in mol %) based on the sum total of the amount of phthalic anhydride used in the activation and the copolymerization, calculated by the formula:

$$R_{PA}=[I13/(I12+I13)]\times 100\% \quad (XXIV)$$

The number-average molecular weight $M_n$ and the weight-average molecular weight $M_w$ of the polyether ester carbonate polyols formed were determined by means of gel permeation chromatography (GPC). The procedure of DIN 55672-1 was followed: "Gel permeation chromatography, Part 1—Tetrahydrofuran as eluent" (SECurity GPC System from PSS Polymer Service, flow rate 1.0 ml/min; columns: 2×PSS SDV linear M, 8×300 mm, 5 µm; RID detector). Polystyrene samples of known molar mass were used for calibration. The polydispersity was calculated as the ratio $M_w/M_n$.

The OH number (hydroxyl number) was determined on the basis of DIN 53240-2, except using N-methylpyrrolidone rather than THF/dichloromethane as the solvent. A 0.5 molar ethanolic KOH solution was used for titration (endpoint recognition by means of potentiometry). The test substance used was castor oil with certified OH number. The reporting of the unit in "$mg_{KOH}/g$" relates to mg[KOH]/g[polyether ester carbonate polyol].

Example 1

Terpolymerization of Propylene Oxide, Maleic Anhydride and $CO_2$

A 300 ml pressure reactor equipped with a sparging stirrer was initially charged with a mixture of DMC-1 catalyst (16 mg) and PET-1 (20 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of a monomer mixture (6.5% by weight of maleic anhydride [corresponding to 4.1 mol %] dissolved in propylene oxide) were metered in with the aid of an HPLC pump (1 ml/min) The reaction mixture was stirred (800 rpm) at 130° C. for 20 min. The addition of 2.0 g of a monomer mixture was repeated for a second time and a third time [second activation stage]. After cooling to 100° C., a further 54.0 g of the monomer mixture (6.5% by weight of maleic anhydride dissolved in propylene oxide) were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture was free of the propylene oxide and maleic anhydride monomers used.

The selectivity g/e was 0.05.

The selectivity e/f was 0.32. This corresponds to a proportion of carbonate units in 23.5% of the repeat units of the polyether ester carbonate polyol ($A_{carbonate}$).

The incorporation of the maleic anhydride resulted in double bonds in 2.7% of the repeat units of the polyether ester carbonate polyol ($A_{double\ bond}$).

The molar mass $M_n$ was 5293 g/mol with a polydispersity of 1.7.

The OH number was 24.9 $mg_{KOH}/g$.

Example 2

Terpolymerization of Propylene Oxide, Maleic Anhydride and $CO_2$ Using an Elevated Amount of Maleic Anhydride A 300 ml pressure reactor equipped with a sparging stirrer was initially charged with a mixture of DMC-1 catalyst (16 mg) and PET-1 (20 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of a monomer mixture (13.3% by weight of maleic anhydride [corresponding to 8.4 mol %] dissolved in propylene oxide) were metered in with the aid of an HPLC pump (1 ml/min) The reaction mixture was stirred (800 rpm) at 130° C. for 20 min. The addition of 2.0 g of a monomer mixture was repeated for a second time and a third time [second activation stage]. After cooling to 100° C., a further 54.0 g of the monomer mixture (13.3% by weight of maleic anhydride dissolved in propylene oxide) were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture was free of the propylene oxide and maleic anhydride monomers used.

The selectivity g/e was 0.02.

The selectivity e/f was 0.36. This corresponds to a proportion of carbonate units in 24.9% of the repeat units of the polyether ester carbonate polyol ($A_{carbonate}$).

The incorporation of the maleic anhydride resulted in double bonds in 6.1% of the repeat units of the polyether ester carbonate polyol ($A_{double\ bond}$).

The molar mass $M_n$ was 5657 g/mol with a polydispersity of 2.2.

The OH number was 27.1 $mg_{KOH}/g$.

Example 3

Terpolymerization of Propylene Oxide, Maleic Anhydride and $CO_2$ Using a Considerably Elevated Amount of Maleic Anhydride A 300 ml pressure reactor equipped with a sparging stirrer was initially charged with a mixture of DMC-1 catalyst (16 mg) and PET-1 (20 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of a monomer mixture (26.2% by weight of maleic anhydride [corresponding to 16.6 mol %] dissolved in propylene oxide) were metered in with the aid of an HPLC pump (1 ml/min) The reaction mixture was stirred (800 rpm) at 130° C. for 20 min. The addition of 2.0 g of a monomer mixture was repeated for a second time and a third time [second activation stage]. After cooling to 100° C., a further 54.0 g of the monomer mixture (26.2% by weight of maleic anhydride dissolved in propylene oxide) were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture was free of the propylene oxide and maleic anhydride monomers used.

The selectivity g/e was 0.02.

The selectivity e/f was 0.52. This corresponds to a proportion of carbonate units in 29.8% of the repeat units of the polyether ester carbonate polyol ($A_{carbonate}$).

The incorporation of the maleic anhydride resulted in double bonds in 12.8% of the repeat units of the polyether ester carbonate polyol ($A_{double\ bond}$).

The molar mass $M_n$ was 4955 g/mol with a polydispersity of 2.1.

The OH number was 25.6 $mg_{KOH}/g$.

Comparative Example 4

Reaction of Propylene Oxide and $CO_2$ without Addition of Maleic Anhydride

A 300 ml pressure reactor equipped with a sparging stirrer was initially charged with a mixture of DMC-1 catalyst (16 mg) and PET-1 (20 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of propylene oxide were metered in with the aid of an HPLC pump (1 ml/min). The reaction mixture was stirred (800 rpm) at 130° C. for 20 min. The addition of 2.0 g of propylene oxide was repeated for a second time and a third time [second activation stage]. After cooling to 100° C., a further 54.0 g of propylene oxide were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture was free of propylene oxide.

The selectivity g/e was 0.09.

The selectivity e/f was 0.26. This corresponds to a proportion of carbonate units in 20.7% of the repeat units of the polyether ester carbonate polyol ($A_{carbonate}$).

The molar mass $M_n$ was 5495 g/mol with a polydispersity of 1.4.

The OH number was 26.2 $mg_{KOH}/g$.

TABLE 1

Overview of the results of examples/comparative examples 1 to 4

| Example | MA concentration in the monomer mixture [% by wt.] | First activation stage (step α) | Second activation stage (step β) | Polymerization stage (step γ) | g/e | e/f |
|---|---|---|---|---|---|---|
| 1 | 6.5 | without MA | with MA | with MA | 0.05 | 0.32 |
| 2 | 13.3 | without MA | with MA | with MA | 0.02 | 0.36 |
| 3 | 26.2 | without MA | with MA | with MA | 0.02 | 0.52 |
| 4 (comp.) | — | without MA | without MA | without MA | 0.09 | 0.26 | comp.: comparative example

Examples 1-3 and comparative example 4 demonstrate that, in the case of addition of cyclic anhydrides in the second activation stage and the polymerization stage, the proportion of cyclic carbonate in the resulting product mixture is suppressed and, at the same time, the proportion of carbon dioxide incorporated into the polymer is increased (examples 1 to 3), compared to the corresponding copolymerization of alkylene oxide and carbon dioxide in the absence of a cyclic carbonate (comparative example 4). A greater amount of anhydride leads to increased incorporation of carbon dioxide into the polyether ester carbonate polyol obtained.

Comparative Example 5

Reaction of Propylene Oxide and $CO_2$ with Addition of Maleic Anhydride Only During the First Activation Stage A 300 ml pressure reactor equipped with a sparging stirrer was initially charged with a mixture of DMC-1 catalyst (16 mg), PET-1 (20 g) and maleic anhydride (1.6 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of propylene oxide were metered in with the aid of an HPLC pump (1 ml/min) The reaction mixture was stirred (800 rpm) at 130° C. for 20 min. The addition of 2.0 g of propylene oxide was repeated for a second time and a third time [second activation stage]. After cooling to 100° C., a further 52.4 g of propylene oxide were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture contained 29% by weight of unreacted propylene oxide.

The resulting mixture was free of maleic anhydride.

The selectivity g/e was 0.30.

The selectivity e/f was 0.21. This corresponds to a proportion of carbonate units in 17.3% of the repeat units of the polyether ester carbonate polyol ($A_{carbonate}$).

The incorporation of the maleic anhydride resulted in double bonds in 1.29% of the repeat units of the polyether ester carbonate polyol ($A_{double\ bond}$).

The molar mass $M_n$ was 3092 g/mol with a polydispersity of 2.9.

The OH number was 44.5 $mg_{KOH}$/g.

Comparative Example 6

Reaction of Propylene Oxide and $CO_2$ with Addition of Maleic Anhydride Only During the Second Activation Stage A 300 ml pressure reactor equipped with a sparging stirrer was initially charged with a mixture of DMC-1 catalyst (16 mg) and PET-1 (20 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of a monomer mixture (26.2% by weight of maleic anhydride [corresponding to 16.6 mol %] dissolved in propylene oxide) were metered in with the aid of an HPLC pump (1 ml/min) The reaction mixture was stirred (800 rpm) at 130° C. for 20 min. The addition of 2.0 g of propylene oxide mixture was repeated for a second time and a third time [second activation stage]. After cooling to 100° C., a further 54.0 g of propylene oxide were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture was free of the propylene oxide and maleic anhydride monomers used.

The selectivity g/e was 0.06.

The selectivity e/f was 0.28. This corresponds to a proportion of carbonate units in 22.1% of the repeat units of the polyether ester carbonate polyol ($A_{carbonate}$).

The incorporation of the maleic anhydride resulted in double bonds in 1.63% of the repeat units of the polyether ester carbonate polyol ($A_{double\ bond}$).

The molar mass $M_n$ was 4646 g/mol with a polydispersity of 1.4.

The OH number was 26.1 $mg_{KOH}$/g.

Example 7

Reaction of Propylene Oxide and $CO_2$ with Addition of Maleic Anhydride Only During the Polymerization Stage A 300 ml pressure reactor equipped with a sparging stirrer was initially charged with a mixture of DMC-1 catalyst (16 mg) and PET-1 (20 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of propylene oxide were metered in with the aid of an HPLC pump (1 ml/min). The reaction mixture was stirred (800 rpm) at 130° C. for 20 min. The addition of 2.0 g of propylene oxide was repeated for a second time and a third time [second activation stage]. After cooling to 100° C., a further 54.0 g of the monomer mixture (26.2% by weight of maleic anhydride dissolved in propylene oxide) were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture was free of the propylene oxide and maleic anhydride monomers used.

The selectivity g/e was 0.03.

The selectivity e/f was 0.42. This corresponds to a proportion of carbonate units in 29.5% of the repeat units of the polyether ester carbonate polyol ($A_{carbonate}$).

The incorporation of the maleic anhydride resulted in double bonds in 10.74% of the repeat units of the polyether ester carbonate polyol ($A_{double\ bond}$).

The molar mass $M_n$ was 5317 g/mol with a polydispersity of 1.8.

The OH number was 26.4 $mg_{KOH}$/g.

TABLE 2

Overview of the results of examples/comparative examples 3 to 7

| Example | First activation stage (step α) | Second activation stage (step β) | Polymerization stage (step γ) | g/e | e/f |
|---|---|---|---|---|---|
| 5 (comp.) | with MA | without MA | without MA | 0.30 | 0.21 |
| 6 (comp.) | without MA | with MA | without MA | 0.06 | 0.28 |

TABLE 2-continued

Overview of the results of examples/comparative examples 3 to 7

| Example | First activation stage (step α) | Second activation stage (step β) | Polymerization stage (step γ) | g/e | e/f |
|---|---|---|---|---|---|
| 7 | without MA | without MA | with MA | 0.03 | 0.42 |
| 3 | without MA | with MA | with MA | 0.02 | 0.52 |
| 4 (comp.) | without MA | without MA | without MA | 0.09 | 0.26 | comp.: comparative example

Examples 3 and 7 and comparative examples 4 to 6 demonstrate that, in the case of addition of cyclic anhydrides in the polymerization stage (examples 3 and 7), the proportion of cyclic carbonate in the resulting product mixture is suppressed and, at the same time, the proportion of carbon dioxide incorporated into the polymer is increased, compared to the corresponding copolymerization of alkylene oxide and carbon dioxide in the absence of a cyclic carbonate (comparative example 4), or compared to an addition of cyclic anhydrides only in the first or second activation stage (comparative examples 5 and 6).

Example 8

Terpolymerization of Propylene Oxide, Maleic Anhydride and $CO_2$ with DMC-2 Catalyst A 300 ml pressure reactor equipped with a sparging stirrer was initially charged with a mixture of DMC-2 catalyst (16 mg) and PET-1 (40.0 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 4.0 g of a monomer mixture (30.0% by weight of maleic anhydride [corresponding to 20.0 mol %] dissolved in propylene oxide) were metered in with the aid of an HPLC pump (1 ml/min) The reaction mixture was stirred (1200 rpm) at 130° C. for 20 min. The addition of 4.0 g of a monomer mixture was repeated for a second time and a third time [second activation stage]. After cooling to 100° C., a further 28.0 g of the monomer mixture (30.0% by weight of maleic anhydride dissolved in propylene oxide) were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture contained 2.51% by weight of unreacted propylene oxide ($R_{PO}$).
The resulting mixture was free of maleic anhydride.
The selectivity g/e was 0.05.
The selectivity e/f was 0.32. This corresponds to a proportion of carbonate units in 20.7% of the repeat units of the polyether ester carbonate polyol ($A_{carbonate}$).
The incorporation of the maleic anhydride resulted in double bonds in 11.7% of the repeat units of the polyether ester carbonate polyol ($A_{double\ bond}$).
The molar mass $M_n$ was 3023 g/mol with a polydispersity of 1.20.
The OH number was 53.2 $mg_{KOH}$/g.

Comparative Example 9

Reaction of Propylene Oxide and $CO_2$ without Addition of Maleic Anhydride with DMC-2 Catalyst A 300 ml pressure reactor equipped with a sparging stirrer was initially charged with a mixture of DMC-2 catalyst (16 mg) and PET-1 (40.0 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 4.0 g of propylene oxide were metered in with the aid of an HPLC pump (1 ml/min) The reaction mixture was stirred (1200 rpm) at 130° C. for 20 min. The addition of 4.0 g of propylene oxide was repeated for a second time and a third time [second activation stage]. After cooling to 100° C., a further 28.0 g of propylene oxide were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture contained 4.04% by weight of unreacted propylene oxide ($R_{PO}$).
The resulting mixture was free of maleic anhydride.
The selectivity g/e was 0.30.
The selectivity e/f was 0.22. This corresponds to a proportion of carbonate units in 16.4% of the repeat units of the polyether ester carbonate polyol ($A_{carbonate}$).
The molar mass $M_n$ was 2253 g/mol with a polydispersity of 1.09.
The OH number was 62.8 $mg_{KOH}$/g.

TABLE 1

Overview of the results of examples/comparative examples 8 to 9

| Example | MA concentration in the monomer mixture [% by wt.] | First activation stage (step α) | Second activation stage (step β) | Polymerization stage (step γ) | g/e | e/f |
|---|---|---|---|---|---|---|
| 8 | 30.0 | without MA | with MA | with MA | 0.05 | 0.32 |
| 9 (comp.) | — | without MA | without MA | without MA | 0.30 | 0.22 | comp.: comparative example

Example 8 and comparative example 9 demonstrate that, in the case of addition of cyclic anhydrides in the second activation stage and the polymerization stage, the proportion of cyclic carbonate in the resulting product mixture is suppressed and, at the same time, the proportion of carbon dioxide incorporated into the polymer is increased (example 8), compared to the corresponding copolymerization of alkylene oxide and carbon dioxide in the absence of a cyclic carbonate (comparative example 9).

Example 10

Terpolymerization of Propylene Oxide, Maleic Anhydride and $CO_2$ with DMC-$TiO_2$ Catalyst A 300 ml pressure reactor equipped with a sparging stirrer was initially charged with a mixture of DMC-$TiO_2$ catalyst (104 mg) and PET-1 (40.0 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 4.0 g of a monomer mixture (30.0% by weight of maleic anhydride [corresponding to 20.0 mol %] dissolved in propylene oxide) were metered in with the aid of an HPLC pump (1 ml/min) The reaction mixture was stirred (1200 rpm) at 130° C. for 20 min. The addition of 4.0 g of a monomer mixture was repeated for a second time and a third time [second activation stage]. After cooling to 100° C., a further 28.0 g of the monomer mixture (30.0% by weight of maleic anhydride dissolved in propylene oxide) were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture contained 0.8% by weight of unreacted propylene oxide ($R_{PO}$).

The resulting mixture was free of maleic anhydride.

The selectivity g/e was 0.02.

The selectivity e/f was 0.25. This corresponds to a proportion of carbonate units in 18.5% of the repeat units of the polyether ester carbonate polyol ($A_{carbonate}$).

The incorporation of the maleic anhydride resulted in double bonds in 10.2% of the repeat units of the polyether ester carbonate polyol ($A_{double\ bond}$).

The molar mass $M_n$ was 2643 g/mol with a polydispersity of 2.2.

The OH number was 54.5 $mg_{KOH}$/g.

Comparative Example 11

Reaction of Propylene Oxide and $CO_2$ without Addition of Maleic Anhydride with DMC-$TiO_2$ Catalyst A 300 ml pressure reactor equipped with a sparging stirrer was initially charged with a mixture of DMC-$TiO_2$ catalyst (104 mg) and PET-1 (40.0 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 4.0 g of propylene oxide were metered in with the aid of an HPLC pump (1 ml/min) The reaction mixture was stirred (1200 rpm) at 130° C. for 20 min. The addition of 4.0 g of propylene oxide was repeated for a second time and a third time [second activation stage]. After cooling to 100° C., a further 28.0 g of propylene oxide were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture contained 0.8% by weight of unreacted propylene oxide ($R_{PO}$).

The resulting mixture was free of maleic anhydride.

The selectivity g/e was 0.27.

The selectivity e/f was 0.13. This corresponds to a proportion of carbonate units in 11.4% of the repeat units of the polyether ester carbonate polyol ($A_{carbonate}$).

The molar mass $M_n$ was 2466 g/mol with a polydispersity of 1.3.

The OH number was 62.3 $mg_{KOH}$/g.

TABLE 1

Overview of the results of examples/comparative examples 8 to 9

| Example | MA concentration in the monomer mixture [% by wt.] | First activation stage (step α) | Second activation stage (step β) | Polymerization stage (step γ) | g/e | e/f |
|---|---|---|---|---|---|---|
| 10 | 30.0 | without MA | with MA | with MA | 0.02 | 0.25 |
| 11 (comp.) | — | without MA | without MA | without MA | 0.27 | 0.13 | comp.: comparative example

Example 10 and comparative example 11 demonstrate that, in the case of addition of cyclic anhydrides in the second activation stage and the polymerization stage, the proportion of cyclic carbonate in the resulting product mixture is suppressed and, at the same time, the proportion of carbon dioxide incorporated into the polymer is increased (example 10), compared to the corresponding copolymerization of alkylene oxide and carbon dioxide in the absence of a cyclic carbonate (comparative example 11). A greater amount of anhydride leads to increased incorporation of carbon dioxide into the polyether ester carbonate polyol obtained.

Example 12

Terpolymerization of Propylene Oxide, Maleic Anhydride and $CO_2$ with DMC-$SiO_2$ Catalyst A 300 ml pressure reactor equipped with a sparging stirrer was initially charged with a mixture of DMC-$SiO_2$ catalyst (93 mg) and PET-1 (40.0 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 4.0 g of a monomer mixture (30.0% by weight of maleic anhydride [corresponding to 20.0 mol %] dissolved in propylene oxide) were metered in with the aid of an HPLC pump (1 ml/min) The reaction mixture was stirred (1200 rpm) at 130° C. for 20 min. The addition of 4.0 g of a monomer mixture was repeated for a second time and a third time [second activation stage]. After cooling to 100° C., a further 28.0 g of the monomer mixture (30.0% by weight of maleic anhydride dissolved in propylene oxide) were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture was free of the propylene oxide and maleic anhydride monomers used.

The selectivity g/e was 0.03.

The selectivity e/f was 0.17. This corresponds to a proportion of carbonate units in 11.5% of the repeat units of the polyether ester carbonate polyol ($A_{carbonate}$).

The incorporation of the maleic anhydride resulted in double bonds in 10.2% of the repeat units of the polyether ester carbonate polyol ($A_{double\ bond}$).

The molar mass $M_n$ was 2484 g/mol with a polydispersity of 1.20.

The OH number was 54.2 $mg_{KOH}$/g.

Comparative Example 13

Reaction of Propylene Oxide and $CO_2$ without Addition of Maleic Anhydride with DMC-$SiO_2$ Catalyst A 300 ml pressure reactor equipped with a sparging stirrer was initially charged with a mixture of DMC-$SiO_2$ catalyst (93 mg) and PET-1 (40.0 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 4.0 g of propylene oxide were metered in with the aid of an HPLC pump (1 ml/min) The reaction mixture was stirred (1200 rpm) at 130° C. for 20 min. The addition of 4.0 g of propylene oxide was repeated for a second time and a third time [second activation stage]. After cooling to 100° C., a further 28.0 g of propylene oxide were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture contained 0.8% by weight of unreacted propylene oxide ($R_{PO}$).
The resulting mixture was free of maleic anhydride.
The selectivity g/e was 0.42.
The selectivity e/f was 0.13. This corresponds to a proportion of carbonate units in 11.3% of the repeat units of the polyether ester carbonate polyol ($A_{carbonate}$).
The molar mass $M_n$ was 2261 g/mol with a polydispersity of 1.4.
The OH number was 64.6 $mg_{KOH}$/g.

TABLE 1

Overview of the results of examples/comparative examples 10 to 11

| Example | MA concentration in the monomer mixture [% by wt.] | First activation stage (step α) | Second activation stage (step β) | Polymerization stage (step γ) | g/e | e/f |
|---|---|---|---|---|---|---|
| 12 | 30.0 | without MA | with MA | with MA | 0.03 | 0.17 |
| 13 (comp.) | — | without MA | without MA | without MA | 0.42 | 0.13 | comp.: comparative example

Example 12 and comparative example 13 demonstrate that, in the case of addition of cyclic anhydrides in the second activation stage and the polymerization stage, the proportion of cyclic carbonate in the resulting product mixture is suppressed and, at the same time, the proportion of carbon dioxide incorporated into the polymer is increased (example 12), compared to the corresponding copolymerization of alkylene oxide and carbon dioxide in the absence of a cyclic carbonate (comparative example 13). A greater amount of anhydride leads to increased incorporation of carbon dioxide into the polyether ester carbonate polyol obtained.

Example 14

Reaction of Styrene Oxide and $CO_2$ with Addition of Phthalic Anhydride During the Second Activation Stage and the Polymerization Stage A 300 ml pressure reactor equipped with an impeller stirrer was initially charged with a mixture of DMC-1 catalyst (8 mg) and PET-1 (3 g), and the mixture was stirred (500 rpm) at 130° C. under a slight vacuum (500 mbar) and a gentle $CO_2$ stream for 30 min [first activation stage]. After injection of $CO_2$ to 15 bar, in the course of which a slight drop in temperature was observed, and re-attainment of a temperature of 130° C., 7.5 g of a monomer mixture (10% by weight of phthalic anhydride [corresponding to 7.4 mol %] dissolved in styrene oxide) were metered in with the aid of an HPLC pump (1 ml/min) The reaction mixture was stirred (500 rpm) at 130° C. for 30 min [second activation stage]. After cooling to 100° C., a further 32.5 g of the monomer mixture (10% by weight of phthalic anhydride dissolved in styrene oxide) were metered in using an HPLC pump (1 ml/min), in the course of which the $CO_2$ pressure was kept constant at 15 bar. Subsequently, the reaction mixture was stirred at 100° C. for a further 3 h [polymerization stage]. The reaction was stopped by cooling the reactor with ice-water.

The resulting mixture contained 6% of unreacted styrene oxide ($R_{SO}$).
The selectivity g'/e' was 0.08.
The selectivity e'/f' was 0.25. This corresponds to a proportion of carbonate units in 20.0% of the repeat units of the polyether ester carbonate polyol ($A_{carbonate}$).

Comparative Example 15

Reaction of Styrene Oxide and $CO_2$ without Addition of Phthalic Anhydride

A 300 ml pressure reactor equipped with an impeller stirrer was initially charged with a mixture of DMC-1 catalyst (8 mg) and PET-1 (3 g), and the mixture was stirred (500 rpm) at 130° C. under a slight vacuum (500 mbar) and a gentle $CO_2$ stream for 30 min [first activation stage]. After injection of $CO_2$ to 15 bar, in the course of which a slight drop in temperature was observed, and re-attainment of a temperature of 130° C., 7.5 g of a styrene oxide were metered in with the aid of an HPLC pump (1 ml/min) The reaction mixture was stirred (500 rpm) at 130° C. for 30 min [second activation stage]. After cooling to 100° C., a further 32.5 g of styrene oxide were metered in using an HPLC pump (1 ml/min), in the course of which the $CO_2$ pressure was kept constant at 15 bar. Subsequently, the reaction mixture was stirred at 100° C. for a further 3 h [polymerization stage] The reaction was stopped by cooling the reactor with ice-water.

The resulting mixture contained 11% of unreacted styrene oxide ($R_{SO}$).
The selectivity g'/e' was 0.18.
The selectivity e'/f' was 0.12. This corresponds to a proportion of carbonate units in 11.0% of the repeat units of the polyether ester carbonate polyol ($A_{carbonate}$).

TABLE 3

Overview of the results of examples/comparative examples 12 and 13

| Example | First activation stage (step α) | Second activation stage (step β) | Polymerization stage (step γ) | $R_{SO}$ (mol %) | g'/e' | e'/f' |
|---|---|---|---|---|---|---|
| 14 | without PA | with PA | with PA | 6 | 0.08 | 0.25 |
| 15 (comp.) | without PA | without PA | without PA | 11 | 0.18 | 0.12 | comp.: comparative example

A comparison of example 14 with comparative example 15 shows that an addition of phthalic anhydride during the second activation stage and the polymerization stage brings about a distinct increase in the ratio of cyclic carbonate to linear carbonate (lower ratio g'/e') in the reaction of styrene oxide and $CO_2$ too. Equally, the $CO_2$ incorporation into the polymer is also improved (increased ratio e'/f'). In addition, the amount of unconverted styrene oxide is reduced (lower $R_{SO}$).

The invention claimed is:

1. A process for preparing a polyether ester carbonate polyol comprising
    conducting catalytic addition of carbon dioxide, with one or more alkylene oxides and one or more cyclic anhydrides onto one or more H-functional starter substances in the presence of a double metal cyanide (DMC) catalyst,
        wherein, in a first step (α), the DMC catalyst and the one or more H-functional starter substances are initially charged and, in a second step (β), the DMC catalyst is activated by addition of the one or more alkylene oxides and $CO_2$ and optionally one or more cyclic anhydrides,
        wherein, in the second step (β), a portion (based on the total amount of alkylene oxides used in steps (β) and (γ)) of the one or more alkylene oxides and optionally a portion (based on the total amount of cyclic anhydrides used in steps (β) and (γ) of the one or more cyclic anhydrides is added to a mixture resulting from step (α),
        wherein addition of the portion of the one or more alkylene oxides can be effected in the presence of $CO_2$ and/or inert gas, and
        wherein the second step (β) can also be effected more than once, and,
    in a third step (γ), which is in a polymerization stage, the one or more alkylene oxides, the one or more cyclic anhydrides, and a $CO_2$ monomer are metered constantly into a mixture resulting from the second step (β).

2. The process as claimed in claim 1, wherein, in (α),
    (α1) a reactor is initially charged with the DMC catalyst and one or more H-functional starter compounds,
    (α2) an inert gas-carbon dioxide mixture or carbon dioxide is passed through the reactor at a temperature of 50 to 200° C. and, at the same time, a reduced pressure (in absolute terms) of 10 mbar to 800 mbar is established in the reactor by removing the inert gas or carbon dioxide to conduct a first activation stage.

3. The process as claimed in claim 2, wherein the double metal cyanide catalyst is added to the H-functional starter substance and/or a mixture of at least two H-functional starter substances in (α1) and/or immediately thereafter in (α2).

4. The process as claimed in claim 1, wherein, in (γ), the carbon dioxide is introduced into the mixture by
    (i) sparging a reaction mixture in the reactor from below,
    (ii) using a hollow-shaft stirrer,
    (iii) combination of metering methods set forth in said (i) and (ii), and/or
    (iv) sparging via a liquid surface by use of one or more multilevel stirrer units.

5. The process as claimed in claim 1, wherein, in steps (β) and/or (γ), the carbon dioxide is introduced into the mixture by sparging the reaction mixture in the reactor from below using an inlet tube, using a sparging ring and/or using a combination of inlet tube and/or sparging ring with a gas-distributing stirrer.

6. The process as claimed in claim 1, wherein the polymerization stage (γ) is conducted in a stirred tank, tubular reactor and/or loop reactor.

7. The process as claimed in claim 1, wherein the cyclic anhydride used is at least one compound of the formula (II), (III) or (IV)

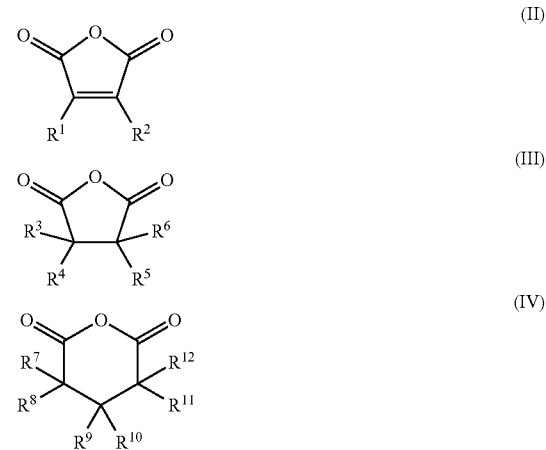

where
    R1 and R2 are each hydrogen, halogen, C1-C22-alkyl, C1-C22-alkenyl or C6-C18-aryl, or R1 and R2 are members of a 4- to 7-membered ring or polycyclic system,
    R3, R4, R5 and R6 are each hydrogen, C1-C22-alkyl, C1-C22-alkenyl or C6-C18-aryl or are members of a 4- to 7-membered ring or polycyclic system and
    R7, R8, R9, R10, R11 and R12 are each hydrogen, C1-C22-alkyl, C1-C22-alkenyl or C6-C18-aryl or are members of a 4- to 7-membered ring or polycyclic system.

8. The process as claimed in claim 1, wherein the cyclic anhydride used is at least one compound selected from the group consisting of maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride and allylnorbornenedioic anhydride.

9. The process as claimed in claim 1, wherein the one or more H-functional starter substances used are selected from at least one of the group consisting of alcohols, amines, thiols, amino alcohols, thio alcohols, hydroxy esters, polyether polyols, polyester polyols, polyester ether polyols, polycarbonate polyols, polyether carbonate polyols, polyethyleneimines, polyetheramines, polytetrahydrofurans, polyether thiols, polyacrylate polyols, castor oil, the mono- or diglyceride of castor oil, monoglycerides of fatty acids, chemically modified mono-, di- and/or triglycerides of fatty acids and $C_{1-24}$-alkyl fatty acid esters containing an average of at least 2 OH groups per molecule.

10. The process as claimed in claim 1, wherein the one or more H-functional starter substances used are selected from at least one of the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, di- and tri-functional polyether polyols, where the polyether polyol has been formed from a di- or tri-H-functional starter substance and propylene oxide or a di- or tri-H-functional starter substance, propylene oxide and ethylene oxide and the polyether polyols have a molecular weight $M''$ in a range from 62 to 4500 g/mol and a functionality of 2 to 3.

11. The process as claimed in claim 1, wherein the double metal cyanide catalyst used comprises at least one double cyanide compound selected from the group consisting of zinc hexacyanocobaltate(III), zinc hexacyanoiridate(III), zinc hexacyanoferrate(III) and cobalt(II) hexacyanocobaltate(III).

12. The process as claimed in claim 1, wherein the double metal cyanide catalyst comprises at least one unsaturated alcohol as an organic complex ligand.

13. The process as claimed in claim 1, wherein the double metal cyanide catalyst used comprises at least one organic complex ligand selected from the group consisting of aliphatic ether, ethanol, isopropanol, n-butanol, isobutanol, sec-butanol, tert-butanol, 2-methyl-3-buten-2-ol, 2-methyl-3-butyn-2-ol, ethylene glycol mono-tert-butyl ether, diethylene glycol mono-tert-butyl ether, tripropylene glycol monomethyl ether and 3-methyl-3-oxetanemethanol.

14. The process as claimed in claim 1, wherein DMC catalyst is activated by addition of alkylene oxide, $CO_2$ and one or more cyclic anhydrides.

15. The process as claimed in claim 1, wherein the polymerization stage ($\gamma$) is conducted at a temperature of 60 to 150° C.

16. The process as claimed in claim 1, wherein the alkylene oxide used is one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di-and triglycerides, epoxidized fatty acids, $C_1$-$C_{24}$ esters of epoxidized fatty acids, epichlorohydrin, glycidol, and derivatives of glycidol, and epoxy-functional alkyloxysilanes.

17. The process as claimed in claim 1, wherein the alkylene oxide used is one or more compounds selected from the group consisting of ethylene oxide and propylene oxide.

18. The process as claimed in claim 1, wherein, in step ($\beta$), the amount of cyclic anhydride and alkylene oxide are used in molar ratios of 1:2 to 1:100.

* * * * *